US012785342B2

(12) United States Patent
Wang et al.

(10) Patent No.: US 12,785,342 B2
(45) Date of Patent: Nov. 3, 2026

(54) DURABLE, COMPACT, COST EFFECTIVE, AND SELF-ALIGNING ELECTRICAL CONNECTOR

(71) Applicant: Honeywell International Inc., Charlotte, NC (US)

(72) Inventors: Fei Wang, Suzhou (CN); Yanlin Liu, Shanghai (CN); Siqin Yu, Shanghai (CN); Zhizhen Shen, Shanghai (CN); Rongquan Li, Shanghai (CN)

(73) Assignee: Honeywell Aerospace US LLC, Phoenix, AZ (US)

( * ) Notice: Subject to any disclaimer, the term of this patent is extended or adjusted under 35 U.S.C. 154(b) by 354 days.

(21) Appl. No.: 18/649,664

(22) Filed: Apr. 29, 2024

(65) Prior Publication Data

US 2025/0337205 A1 Oct. 30, 2025

(51) Int. Cl.

| | |
|---|---|
| ***H01R 24/86*** | (2011.01) |
| ***H01R 13/50*** | (2006.01) |
| ***H01R 13/502*** | (2006.01) |
| ***H01R 13/66*** | (2006.01) |

(52) U.S. Cl.

CPC ............. *H01R 24/86* (2013.01); *H01R 13/50* (2013.01); *H01R 13/502* (2013.01); *H01R 13/6683* (2013.01)

(58) Field of Classification Search

CPC ...... H01R 24/86; H01R 13/50; H01R 13/502; H01R 13/6683; H01R 13/02; H01R 12/50;

(Continued)

(56) References Cited

U.S. PATENT DOCUMENTS 6,469,909 B2 10/2002 Simmons
7,238,999 B2 7/2007 LaFond et al.
(Continued)

FOREIGN PATENT DOCUMENTS

CN 115144612 A 10/2022
CN 121863122 A * 4/2026 .......... H01R 13/502
(Continued)

OTHER PUBLICATIONS

Honeywell, "HGUIDE I400 Inertial Measurement Unit", as downloaded Mar. 1, 2024 from https://aerospace.honeywell.com/content/dam/aerobt/en/documents/learn/products/sensors/brochures/i400-HGUIDE-bro.pdf, pp. 1 through 2.
(Continued)

*Primary Examiner* — Travis S Chambers
(74) *Attorney, Agent, or Firm* — Fogg & Powers LLC

(57) ABSTRACT

A package of a payload (or payload package) includes a payload package electrical connector, a first package portion, and a second package portion. The first and second package portions form a body of the payload package. The payload package electrical connector, e.g., a body thereof, and one of the first and second package portions each have at least one beveled sidewall which are configured to abut one another. Optionally, a payload, e.g., an inertial measurement unit, is further configured to be mounted in the payload package, e.g., in the payload package body, for example on one of the first or second package portions. The design of such payload package results in a payload package which is durable, compact, cost effective, and which facilitates self alignment of a payload package electrical connector to the body of the payload package. Further the payload is better isolated from shock and vibration.

20 Claims, 5 Drawing Sheets

(58) Field of Classification Search
CPC .. H01R 13/40; G01D 11/245; G01C 19/5769; G01C 19/5783; G01P 1/023
See application file for complete search history.

(56) References Cited

U.S. PATENT DOCUMENTS

| | | | |
|---|---|---|---|
| 7,560,811 | B2 | 7/2009 | Sakakibara et al. |
| 8,115,983 | B2 | 2/2012 | Miles et al. |
| 8,294,535 | B2 | 10/2012 | Feiertag et al. |
| 10,962,561 | B2 | 3/2021 | Lebron et al. |
| 11,851,322 | B2 | 12/2023 | Schaller et al. |
| 2004/0200279 | A1 | 10/2004 | Mitani et al. |
| 2020/0057088 | A1 | 2/2020 | Lebron et al. |
| 2020/0378764 | A1 | 12/2020 | Kihara et al. |

FOREIGN PATENT DOCUMENTS

| | | | | |
|---|---|---|---|---|
| EP | 1630561 A1 | | 3/2006 | |
| EP | 1642365 B1 | | 5/2007 | |
| EP | 2918454 A1 | | 9/2015 | |
| EP | 2075221 B1 | | 12/2015 | |
| JP | 7635317 B2 | * | 2/2025 | ............. H01R 24/38 |
| WO | WO-2019161033 A1 | * | 8/2019 | ............. H01R 13/22 |

OTHER PUBLICATIONS

Honeywell, "HGuide I400 MEMS Inertial Measurement Unit", as downloaded Feb. 21, 2024 from https://aerospace.honeywell.com/us/en/products-and-services/product/hardware-and-systems/sensors/hguide-i400, pp. 1 through 2.

European Patent Office, "Extended European Search Report", dated Sep. 24, 2025, from EP Application No. 25168679.6, from Foreign Counterpart to U.S. Appl. No. 18/649,664, pp. 1 through 10, Published: EP.

European Patent Office, "Communication pursuant to Article 94(3)EPC", dated May 21, 2026, from U.S. Appl. No. 18/649,664, from Foreign Counterpart to U.S. Appl. No. 18/649,664, pp. 1 through 5, Published: EP.

* cited by examiner

DURABLE, COMPACT, COST EFFECTIVE, AND SELF-ALIGNING ELECTRICAL CONNECTOR

BACKGROUND

An inertial management unit (IMU) is exposed to shocks and vibrations. Typically, a connector of a package of the IMU (or IMU package) is attached to the package with an adhesive, screws, or with solder or welding. The IMU package connector facilitates an electrical connection to the IMU through another connector, e.g., attached to electrical conductors for example in a form of an electrical cable.

Attaching the IMU package connector to the IMU package with an adhesive is labor intensive and, thus, costly. Further, the attachment may fail due to the environment, e.g., thermal expansion, or an environment with salt or acid.

Attaching the IMU package connector to the IMU package with screws is also labor intensive and, thus, costly. Further, use of the screws requires a larger package to facilitate insertion of the screws into the package; the larger package may be unacceptable for certain applications.

Attaching the IMU package connector to the IMU with solder or welding imparts force, onto a printed circuit board (PCB) on which the IMU is attached, when inserting or removing an external connector respectively into or from the IMU package connector. Repeated forces can reduce reliability of connection between the connector of the IMU and the PCB to which it is attached. Further, a resulting direct mechanical connection between the IMU package connector and the PCB, makes the IMU more susceptible to vibration and shock.

SUMMARY

In some aspects, the techniques described herein relate to a package configured to enclose a payload and provide an electrical interface for the payload, the package including: a payload package electrical connector including an electrical connector body and at least one electrical conductor at least partially in the electrical connector body, wherein the electrical connector body has a first beveled sidewall; a package body including a first portion including a first sidewall, a second portion including a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall includes a second beveled sidewall, wherein the payload package electrical connector is configured to be in and encloses the opening, wherein the first beveled sidewall is configured to abut the second beveled sidewall, and wherein the payload package electrical connector, the first portion, and the second portion are configured to enclose the payload; wherein the first portion further includes a first recess; wherein the second portion further includes a second recess; and an internal electrical connector including at least one electrical contact and configured to be inserted into each of the first recess and the second recess; wherein each electrical contact is configured to be electrically connected to the payload configured to be mounted in the cavity; wherein one end of each of the at least one electrical conductor is electrically connected to a unique one of the at least one electrical contact.

In some aspects, the techniques described herein relate to a method of assembling a package, the method including: inserting an internal electrical connector into a third recess of a first portion of a payload package body or a fourth recess of a second portion of the payload package body, wherein the first portion includes a first sidewall, wherein the second portion includes a second sidewall, wherein the first sidewall is opposite the second sidewall, and wherein the internal electrical connector includes at least one electrical contact; inserting a payload package electrical connector into an opening formed in part by a first sidewall and a second sidewall, wherein the payload package electrical connector includes an electrical connector body and at least one electrical conductor at least partially in the electrical connector body, wherein the electrical connector body has a first beveled sidewall, and wherein one of the first sidewall and the second sidewall includes a second beveled sidewall, wherein the first beveled sidewall abuts the second beveled sidewall, wherein each electrical contact is electrically connected to a payload mounted in a cavity formed between the first and the second portions; wherein one end of each of the at least one electrical conductor is electrically connected to a unique one of the at least one electrical contact; and attaching the first portion to the second portion, wherein the payload package electrical connector encloses the opening and the payload is enclosed by the payload package electrical connector, the first portion, and the second portion.

In some aspects, the techniques described herein relate to a payload in a package having an electrical interface to the payload, the payload in the package including: a payload package electrical connector including an electrical connector body and at least one electrical conductor at least partially in the electrical connector body, wherein the electrical connector body has a first beveled sidewall; a package body including a first portion including a first sidewall, a second portion including a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall includes a second beveled sidewall, wherein the payload package electrical connector is in the opening, wherein the first beveled sidewall is configured to abut the second beveled sidewall, and wherein the first portion is attached to the second portion; wherein the first portion further includes a first recess; wherein the second portion further includes a second recess; an internal electrical connector including at least one electrical contact and inserted into each of the first recess and the second recess; wherein each electrical contact is configured to be electrically connected to the payload configured to be mounted in the cavity; where one end of each of the at least one electrical conductor is electrically connected to a unique one of the at least one electrical contact; and the payload directly or indirectly mounted to the first or the second portion, and enclosed by the payload package electrical connector, the first portion, and the second portion.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
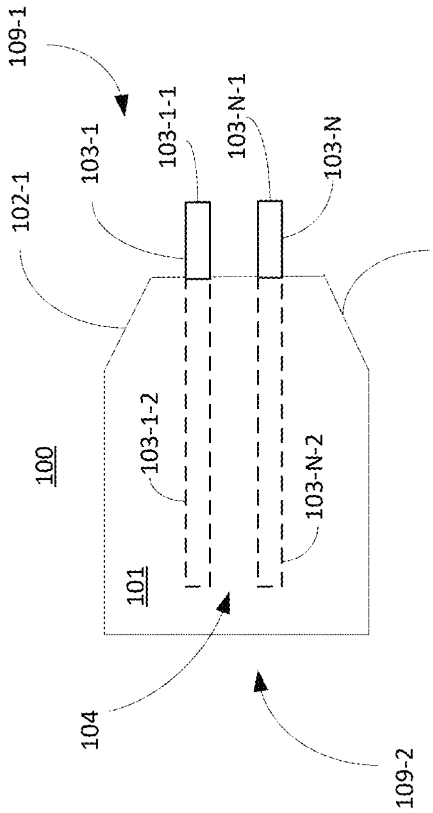
FIG. 1A illustrates a plan view of diagram of one embodiment of a payload package electrical connector.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention provide a package of a payload (or payload package) including a payload package electrical connector, a first package portion, and a second package portion. The first and second package portions form a body of the payload package. The payload package electrical connector, e.g., a body thereof, and one of the first and second package portions each have at least one beveled sidewall which are configured to abut one another.

Optionally, a payload is further configured to be mounted in the payload package, e.g., in the payload package body, for example on one of the first or second package portions. Optionally, the payload is an IMU, e.g., a microelectromechanical systems (MEMS) IMU. Optionally, the payload may comprise more than one device.

The design of such payload package results in a payload package which is durable, compact, cost effective, and which facilitates self alignment of a payload package electrical connector to the body of the payload package. Further the payload is better isolated from shock and vibration.

FIG. 1A illustrates a plan view of diagram of one embodiment of a payload package electrical connector 100. The payload package electrical connector 100 includes an electrical connector body 101 and at least one electrical conductor 103-1, 103-N.

The electrical connector body 101 includes at least one beveled sidewall 102-1, 102-2. Optionally, the electrical connector body 101 includes two beveled sidewalls 102-1, 102-2; optionally, the two beveled sidewalls are opposite one another. Optionally, the electrical connector body 101 includes, e.g., is formed by, an electrical insulator for example plastic.

The at least one electrical conductor 103-1, 103-N includes N electrical conductors. N is an integer greater than zero. Optionally, each electrical conductor includes metal and/or a metal alloy. A first portion (or end) of each electrical conductor 103-1-1, 103-N−1 protrudes from the electrical connector body 101.[1] A second portion of each electrical conductor 103-1-2, 103-N−2 is partially enclosed by an electrode opening 104 in the electrical connector body 101. The electrode opening 104 is configured to receive an external connector including electrical conductor(s) one or more of which each makes mechanical and electrical contact with a second portion of one of the electrical conductors 103-1, 103-N of the payload package electrical connector 100.

[1] Optionally, a second portion or end of the electrical connector, which is opposite the first portion or end, also protrudes from the electrical connector body 101.

Figure 1B:
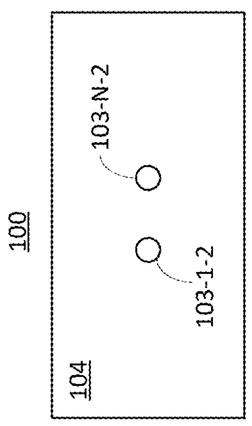
FIG. 1B illustrates a diagram of one embodiment of the payload package electrical connector.

FIG. 1B illustrates a diagram of one embodiment of the payload package electrical connector 100. FIG. 1B further illustrates the electrode opening 104 configured to receive the external connector. For pedagogical purposes, two electrical conductors 103-1, 103-N are shown in FIGS. 1A and 1B; one, two, three, or more electrical conductors may be used in the payload package electrical connector. For pedagogical purposes, in FIG. 1B, each second portion of the illustrated electrical conductors 103-1-2, 103-N−2 is shown to have a circular cross section; other cross-sectional shapes may be used. For pedagogical purposes, in FIG. 1B, the electrode opening 104 is illustrated as having a rectangular cross-section; other cross-sectional shapes may be used.

Returning to FIG. 1A, the payload package electrical connector 100 may be implemented in other ways. Optionally, the electrical connector body 101 may be solid and each electrical conductor 103-1, 103-N may have a first portion protruding from a first side 109-1 of the payload package electrical connector 100 (as discussed elsewhere herein) and a second portion protruding from a second side 109-2 which is opposite the first side 109-1. The payload package electrical connector 100 may be implemented with designs other than those described herein. However, the payload package electrical connector 100 always includes at least one beveled surface as described elsewhere herein.

Figure 2:
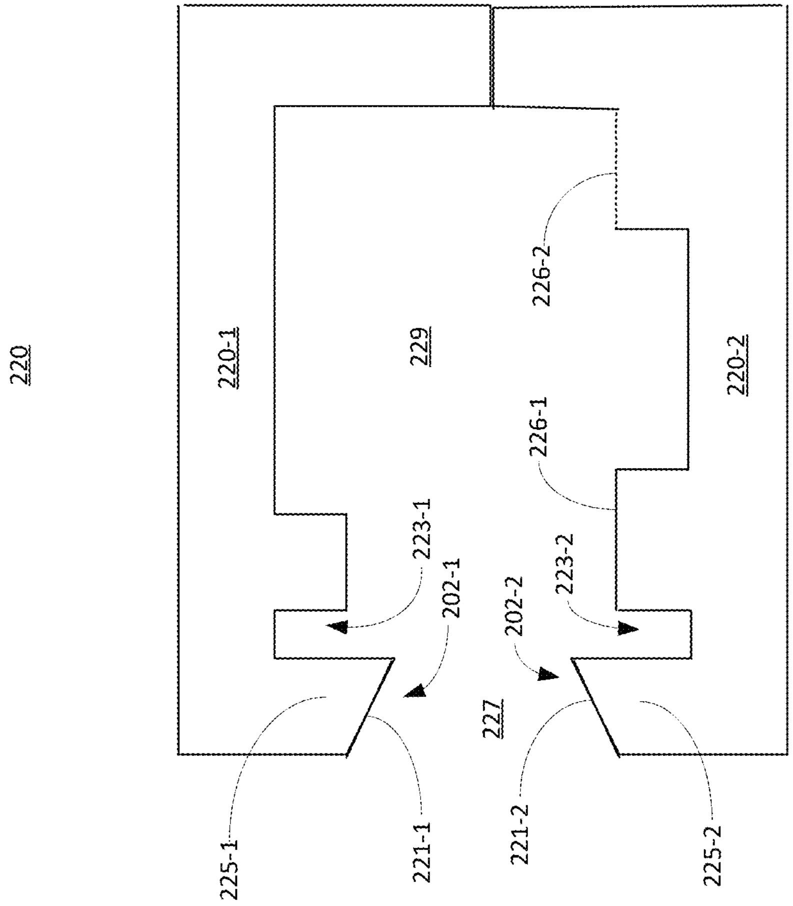
FIG. 2 illustrates a cross-sectional diagram of one embodiment of a payload package body.

FIG. 2 illustrates a cross-sectional diagram of one embodiment of a payload package body 220. The payload package body includes a first portion 220-1 and a second portion 220-2. The first portion 220-1 includes a first recess 202-1 formed by a first sidewall 225-1. The second portion 220-2 includes a second recess 202-2 formed by a second sidewall 225-2. At least one of the first sidewall 225-1 and the second sidewall 225-2 includes a beveled surface 221-1, 221-2[2]. A beveled surface of one portion is opposite the other portion. If both sidewalls 225-1, 225-2 have a beveled surface 221-1, 221-2, then each beveled surface is opposite the other beveled surface. Optionally, the first portion 220-1 and the second portion 220-2 each includes, e.g., is formed by, an electrical insulator for example plastic.

[2] For pedagogical purposes, the first sidewall, e.g., of the first portion 220-1, is illustrated as having a first beveled surface 221-1 and the second sidewall, e.g., of the second portion 220-2, is illustrated as having sa second beveled surface 221-2.

When the first and the second portions are affixed to one another, a connector opening 227 is formed into which the payload package electrical connector 100 is configured to reside. Further, a cavity 229 is formed between, and defined by, the first and the second portions. The first beveled sidewall of the payload package electrical connector 100 is configured to abut the third beveled sidewall of one of the first and second portions 220-1, 220-2 of the payload package body 220. If the payload package electrical connector 100 includes the second beveled sidewall of the payload package electrical connector 100, then the second beveled sidewall is configured to abut the fourth beveled sidewall of the other portion of the payload package body 220.

The first portion 220-1 includes a third recess 223-1. The second portion includes a fourth recess 223-2. The third recess 223-1 is configured to be opposite the fourth recess 223-2.

Optionally, one portion of the payload package body 220 includes at least one pedestal 226-1, 226-2 on which a payload (e.g., an IMU[3], for example a MEMS IMU) may be supported and/or mounted. For pedagogical purposes, the second portion is illustrated as including two pedestals: a first pedestal 226-1 and a second pedestal 226-2; however, zero, one, three, or more pedestals may be used.

[3] The IMU includes at least one of: accelerometer(s) and gyroscope(s).

Figure 3:
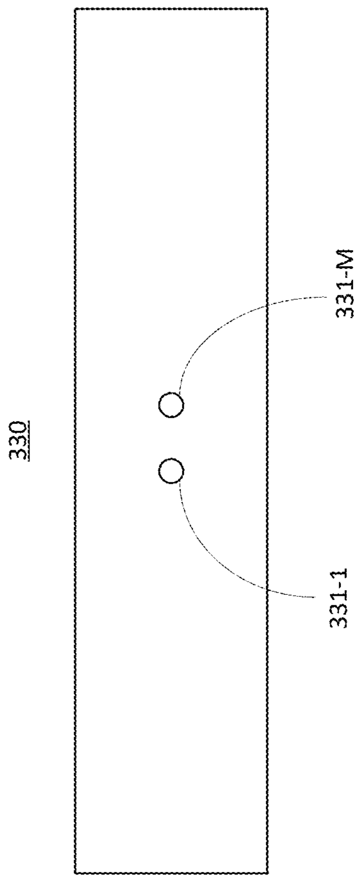
FIG. 3 illustrates one embodiment of an internal electrical connector.

FIG. 3 illustrates one embodiment of an internal electrical connector 330. The internal electrical connector 330 is configured to electrically connect a payload of the payload package with the payload package electrical connector 100 while substantially mechanically isolating the payload package from the payload package electrical connector 100. The internal electrical connector 330 includes at least one electrical contact 331-1, 331-M each of which is configured to make an electrical connection with a unique electrical conductor 103-1, 103-N, e.g., one end thereof, of the payload package electrical connector 100. Optionally, M is an integer greater than zero and may be equal or not equal to N.

For pedagogical purposes, each of the at least one electrical contact 331-1 is illustrated herein as a hole; however, other types of electrical contacts may be used. Each hole is configured to receive a unique electrical conductor of the payload package electrical connector 100. Optionally, an interior of each hole is covered, e.g., plated, with an electrical conductor so as to facilitate an electrical connection between the unique electrical conductor in a hole and the hole. For pedagogical purposes, each hole has a circular cross-section; however, some or all of the holes may have a different cross-sectional shape. Optionally, the internal electrical connector 330 is an internal electrical connector PCB. The internal electrical connector 330 is configured to be mechanically secured, e.g., by friction fitting, by the third and fourth recesses 223-1, 223-2.

Figure 4:
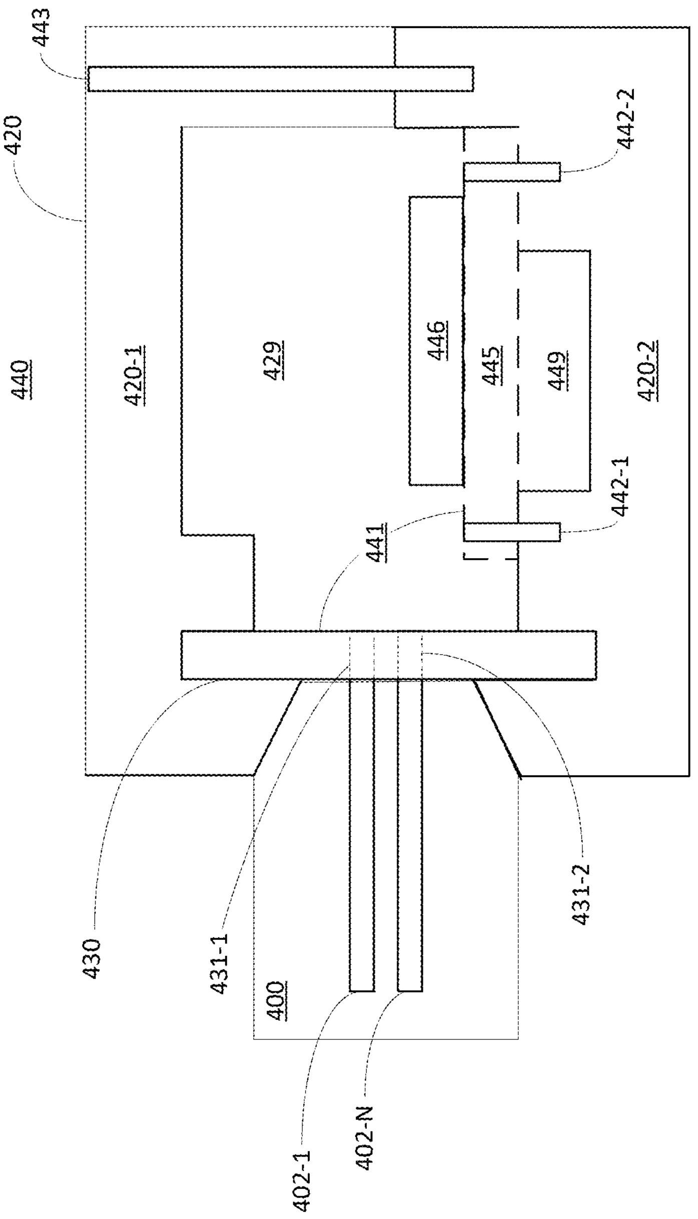
FIG. 4 illustrates a cross-sectional diagram of one embodiment of a packaged payload.

FIG. 4 illustrates a cross-sectional diagram of one embodiment of a packaged payload 440. The packaged payload 440 includes the payload 446, the payload package electrical connector 400, the internal electrical connector 430, and the first portion 420-1 and the second portion 420-2 of the payload package body 420. The payload package electrical connector 400 is an electrical interface between external component(s) (configured to be electrically coupled to the payload) and the payload 446 which is configured to be housed in in a package formed by the payload body 220 and the payload package electrical connector 400. Electrical connection between electrical conductors 402-1, 402-N of the payload package electrical connector 400 to the payload are described elsewhere herein.[4] The payload package electrical connector 400 is in and encloses the connector opening 227. The payload package electrical connector 400 (e.g., the body 101 thereof), the first portion 420-1, and the second portion 420-2 enclose the payload 446.

[4] Optionally one end of each of the electrical conductors 402-1, 402-N of the payload package electrical connector 400, electrically connect with a unique electrical contact of the internal electrical connector 430.

When the first portion 420-1 and the second portion 420-2 are attached by at least one package body attacher 443, e.g., screw(s), nut(s) and bolt(s), adhesive, welding, and/or soldering, the payload package electrical connector 400 is friction fitted between the first portion 420-1 and the second portion 420-2 of the payload package body 420. Such friction fitting of the payload package electrical connector 400 is enhanced by the at least one pair of beveled surfaces of the payload package electrical connector 400 and a portion of the payload package body 420 which abut one another. The payload package electrical connector 400 is self-aligned to the payload package body 420 by the at least one pair of beveled surfaces of the payload package electrical connector 400 and a portion of the payload package body 420 which abut one another.

When the first portion 420-1 and the second portion 420-2 are attached by the at least one package body attacher 443, the internal electrical connector 430 is configured to be friction fitted between the When the first portion 420-1 and the second portion 420-2 are attached by at least one package body attacher 443, e.g., screw(s), nut(s) and bolt(s), adhesive, welding, and/or soldering, the and in the third and the fourth recesses.

For pedagogical purposes, the payload 446 is illustrated as one device. However, in alternative embodiments, the payload 446 may comprise more than one device.

The payload 446 is configured to be mounted, directly or indirectly to one of the portions 420-1, 420-2 of the payload package body 420. Thus, the payload 446 is configured to be mounted in the cavity 429. For pedagogical purposes, the payload 446 is illustrated herein as being mounted to the second portion 420-2 of the payload package body 420; however, alternatively it can be mounted to the first portion 420-1 of the payload package body 420. For pedagogical purposes, the payload 446 is illustrated as being mounted on an optional substrate 445, e.g., a payload PCB, mechanically supports the payload 446 and may provide electrical connections to the payload 446. Optionally, the payload (and the optional substrate 445 if used) may be mounted over a payload mounting recess 449 in the portion of the payload package body to which the payload is directly or indirectly attached.

Optionally, the payload 446 may be secured to the substrate 445 using solder or conductive or non-conductive epoxy. Optionally, the payload 446, e.g., the optional substrate 445, may be mechanically secured to a portion of the payload package body 420 by one or more payload attachers, e.g., screw(s), nut(s) and bolt(s), adhesive, welding, and/or soldering. For pedagogical purposes, FIG. 4 illustrates that the optional substrate 445 is affixed to the second portion 420-2 of the payload package body 420 by at least two attachers 442-1, 442-2.

The payload 446 is electrically coupled to the payload package electrical connector 400 by at least one payload electrical conductor 441. The at least one payload electrical conductor 441 is electrically coupled between the payload 446, or the optional substrate 445 on which the payload 446 is mounted, and at least one, e.g., each, electrical contact of the internal electrical connector 430. Optionally, the at least one payload electrical conductor 441 may be in a form of an electrical cable including the at least one payload electrical conductor 441. Optionally, when the internal electrical connector 430 is a PCB, then the PCB optionally includes electrical conductor(s) each of which electrically connect each electrical contact to a payload electrical conductor.

Figure 5:
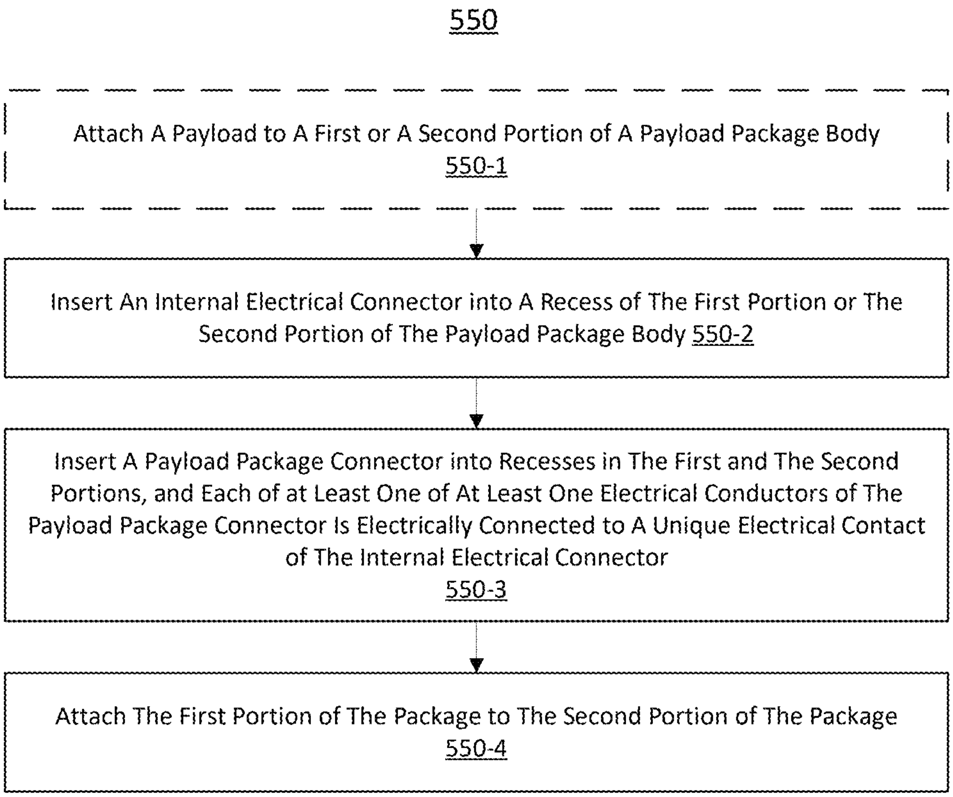
FIG. 5 illustrates a flow diagram of an exemplary method for mounting a payload package electrical connector to a payload package of packaged payload.

FIG. 5 illustrates a flow diagram of an exemplary method 550 for mounting a payload package electrical connector to a payload package of packaged payload (e.g., an IMU, for example a MEMS IMU). Exemplary method 550 may be implemented by one or more of the apparatuses illustrated in FIGS. 1A-4. To the extent the methods herein are described herein as being implemented with one or more of the apparatuses illustrated in FIGS. 1A-4, it is to be understood that other embodiments can be implemented in other ways. Techniques described with respect to the embodiments illustrated by FIGS. 1A-4 may be applicable to the method 550.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In optional block 550-1, a payload is attached to a first or a second portion of a payload package body. Optionally, the payload is attached to the package using one of the techniques described elsewhere herein. Optionally, the payload may be mounted in a cavity of the payload package body as described elsewhere herein. Optionally, the payload is an IMU, e.g., a MEMS IMU. Optionally, block 550-1 is performed prior to block 550-2. In block 550-2, an internal electrical connector is inserted into a third recess of the first portion or a fourth recess in the second portion of the payload package body.

In block 550-3, a payload package electrical connector is inserted into a connector opening formed in part by a first sidewall in a first portion of the payload package body 220 and a second sidewall of the payload package body 220.[5] The payload package electrical connector comprises an electrical connector body and at least one electrical conductor at least partially in the electrical connector body. The electrical connector body has a first beveled sidewall. One of the first sidewall and the second sidewall comprises a second beveled sidewall. The first beveled sidewall abuts the second beveled sidewall. Each electrical contact is electrically connected to a payload mounted in a cavity formed between the first and the second portions. One end of each of the at least one electrical conductor is electrically connected to a unique one of the at least one electrical contact.

[5] The first and the second recesses form the connector opening in the payload package body.

Optionally, another beveled sidewall of the payload package electrical connector abuts another beveled sidewall of respectively one of the second portion 220-2 and the first portion 220-1. Such abutting of beveled sidewalls is further described elsewhere herein. The payload package electrical connector is an electrical interface between external component(s) (configured to be electrically coupled to the payload) and the payload which is configured to be housed in in a package formed by the payload body and the payload package electrical connector.

In block 550-4, the first portion of the payload package body is attached to the second portion of the payload package body. Optionally, such attachment is made using an attacher further described elsewhere herein. As a result, the payload package electrical connector encloses the connector opening and the payload is enclosed by the payload package electrical connector, the first portion, and the second portion.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a package configured to enclose a payload and provide an electrical interface for the payload, the package comprising: a payload package electrical connector comprising an electrical connector body and at least one electrical conductor at least partially in the electrical connector body, wherein the electrical connector body has a first beveled sidewall; a package body comprising a first portion comprising a first sidewall, a second portion comprising a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall comprises a second beveled sidewall, wherein the payload package electrical connector is configured to be in and encloses the opening, wherein the first beveled sidewall is configured to abut the second beveled sidewall, and wherein the payload package electrical connector, the first portion, and the second portion are configured to enclose the payload; wherein the first portion further comprises a first recess; wherein the second portion further comprises a second recess; and an internal electrical connector comprising at least one electrical contact and configured to be inserted into each of the first recess and the second recess; wherein each electrical contact is configured to be electrically connected to the payload configured to be mounted in the cavity; wherein one end of each of the at least one electrical conductor is electrically connected to a unique one of the at least one electrical contact.

Example 2 includes the package of Example 1, wherein the internal electrical connector comprises a printed circuit board; wherein each of the at least one electrical contact comprises a via hole, in the printed circuit board, with an electrically conductive sidewall; wherein the one end of each of the at least one electrical conductor is configured to be inserted into a unique via hole.

Example 3 includes the package of any of Examples 1-2, wherein the package body comprises a third beveled sidewall opposite the first beveled sidewall; wherein the first portion comprises the second beveled sidewall and the second portion comprises a fourth beveled sidewall opposite the second beveled sidewall; wherein the third beveled sidewall is configured to abut the fourth beveled sidewall.

Example 4 includes the package of any of Examples 1-3, wherein each of the at least one electrical contact is configured to be electrically connected to the payload.

Example 5 includes the package of any of Examples 1-4, wherein the first or the second portion further comprises at least one pedestal on which the payload is configured to be directly or indirectly mounted.

Example 6 includes the package of any of Examples 1-5, wherein the electrical connector body comprises an electrical insulator.

Example 7 includes the package of any of Examples 1-6, wherein the first portion and the second portion each comprise an electrical insulator.

Example 8 includes a method of assembling a package, the method comprising: inserting an internal electrical connector into a third recess of a first portion of a payload package body or a fourth recess of a second portion of the payload package body, wherein the first portion comprises a first sidewall, wherein the second portion comprises a second sidewall, wherein the first sidewall is opposite the second sidewall, and wherein the internal electrical connector comprises at least one electrical contact; inserting a payload package electrical connector into an opening formed in part by a first sidewall and a second sidewall, wherein the payload package electrical connector comprises an electrical connector body and at least one electrical conductor at least partially in the electrical connector body, wherein the electrical connector body has a first beveled sidewall, and wherein one of the first sidewall and the second sidewall comprises a second beveled sidewall, wherein the first beveled sidewall abuts the second beveled sidewall, wherein each electrical contact is electrically connected to a payload mounted in a cavity formed between the first and the second portions; wherein one end of each of the at least one electrical conductor is electrically connected to a unique one of the at least one electrical contact; and attaching the first portion to the second portion, wherein the payload package electrical connector encloses the opening and the payload is enclosed by the payload package electrical connector, the first portion, and the second portion.

Example 9 includes the method of Example 8, further comprising attaching the payload to the first or the second portion of the payload package body.

Example 10 includes the method of any of Examples 8-9, wherein the payload package body comprises a third beveled sidewall opposite the first beveled sidewall; wherein the first portion comprises the second beveled sidewall and the second portion comprises a fourth beveled sidewall opposite the second beveled sidewall; wherein the third beveled sidewall abuts the fourth beveled sidewall.

Example 11 includes the method of any of Examples 8-10, wherein the internal electrical connector comprises a printed circuit board; wherein each of the at least one electrical contact comprises a via hole, in the printed circuit board, with an electrically conductive sidewall; wherein the one end of each of the at least one electrical conductor is configured to be inserted into a unique via hole.

Example 12 includes a payload in a package having an electrical interface to the payload, the payload in the package comprising: a payload package electrical connector comprising an electrical connector body and at least one electrical conductor at least partially in the electrical connector body, wherein the electrical connector body has a first beveled sidewall; a package body comprising a first portion comprising a first sidewall, a second portion comprising a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall comprises a second beveled sidewall, wherein the payload package electrical connector is in the opening, wherein the first beveled sidewall is configured to abut the second beveled sidewall, and wherein the first portion is attached to the second portion; wherein the first portion further comprises a first recess; wherein the second portion further comprises a second recess; an internal electrical connector comprising at least one electrical contact and inserted into each of the first recess and the second recess; wherein each electrical contact is configured to be electrically connected to the payload configured to be mounted in the cavity; where one end of each of the at least one electrical conductor is electrically connected to a unique one of the at least one electrical contact; and the payload directly or indirectly mounted to the first or the second portion, and enclosed by the payload package electrical connector, the first portion, and the second portion.

Example 13 includes the payload in the package of Example 12, wherein the payload is an inertial measurement unit.

Example 14 includes the payload in the package of any of Examples 12-13, wherein the payload is a microelectromechanical systems inertial measurement unit.

Example 15 includes the payload in the package of any of Examples 12-14, wherein the internal electrical connector comprises a printed circuit board; wherein each of the at least one electrical contact comprises a via hole, in the printed circuit board, with an electrically conductive sidewall; wherein the one end of each of the at least one electrical conductor is configured to be inserted into a unique via hole.

Example 16 includes the payload in the package of any of Examples 12-15, wherein the package body comprises a third beveled sidewall opposite the first beveled sidewall; wherein the first portion comprises the second beveled sidewall and the second portion comprises a fourth beveled sidewall opposite the second beveled sidewall; wherein the third beveled sidewall is configured to abut the fourth beveled sidewall.

Example 17 includes the payload in the package of any of Examples 12-16, wherein the first or the second portion further comprises at least one pedestal on which the payload is configured to be directly or indirectly mounted.

Example 18 includes the payload in the package of any of Examples 12-17, wherein the electrical connector body comprises an electrical insulator.

Example 19 includes the payload in the package of any of Examples 12-18, wherein the first portion and the second portion each comprise an electrical insulator.

Example 20 includes the payload in the package of any of Examples 12-19, wherein the first portion and the second portion are attached by at least one screw.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A package configured to enclose a payload and provide an electrical interface for the payload, the package comprising:

a payload package electrical connector comprising an electrical connector body and at least one electrical conductor at least partially in the electrical connector body, wherein the electrical connector body has a first beveled sidewall;

a package body comprising a first portion comprising a first sidewall, a second portion comprising a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall comprises a second beveled sidewall, wherein the payload package electrical connector is configured to be in and encloses the opening, wherein the first beveled sidewall is configured to abut the second beveled sidewall, and wherein the payload package electrical connector, the first portion, and the second portion are configured to enclose the payload;

wherein the first portion further comprises a first recess;

wherein the second portion further comprises a second recess; and an internal electrical connector comprising at least one electrical contact and configured to be inserted into each of the first recess and the second recess;

wherein each electrical contact is configured to be electrically connected to the payload configured to be mounted in the cavity;

wherein one end of each of the at least one electrical conductor is electrically connected to a unique one of the at least one electrical contact.

2. The package of claim 1, wherein the internal electrical connector comprises a printed circuit board;

wherein each of the at least one electrical contact comprises a via hole, in the printed circuit board, with an electrically conductive sidewall;

wherein the one end of each of the at least one electrical conductor is configured to be inserted into a unique via hole.

3. The package of claim 1, wherein the package body comprises a third beveled sidewall opposite the first beveled sidewall;

wherein the first portion comprises the second beveled sidewall and the second portion comprises a fourth beveled sidewall opposite the second beveled sidewall;

wherein the third beveled sidewall is configured to abut the fourth beveled sidewall.

4. The package of claim 1, wherein each of the at least one electrical contact is configured to be electrically connected to the payload.

5. The package of claim 1, wherein the first or the second portion further comprises at least one pedestal on which the payload is configured to be directly or indirectly mounted.

6. The package of claim 1, wherein the electrical connector body comprises an electrical insulator.

7. The package of claim 1, wherein the first portion and the second portion each comprise an electrical insulator.

8. A method of assembling a package, the method comprising:

inserting an internal electrical connector into a third recess of a first portion of a payload package body or a fourth recess of a second portion of the payload package body, wherein the first portion comprises a first sidewall, wherein the second portion comprises a second sidewall, wherein the first sidewall is opposite the second sidewall, and wherein the internal electrical connector comprises at least one electrical contact;

inserting a payload package electrical connector into an opening formed in part by a first sidewall and a second sidewall, wherein the payload package electrical connector comprises an electrical connector body and at least one electrical conductor at least partially in the electrical connector body, wherein the electrical connector body has a first beveled sidewall, and wherein one of the first sidewall and the second sidewall comprises a second beveled sidewall, wherein the first beveled sidewall abuts the second beveled sidewall, wherein each electrical contact is electrically connected to a payload mounted in a cavity formed between the first and the second portions; wherein one end of each of the at least one electrical conductor is electrically connected to a unique one of the at least one electrical contact; and attaching the first portion to the second portion, wherein the payload package electrical connector encloses the opening and the payload is enclosed by the payload package electrical connector, the first portion, and the second portion.

9. The method of claim 8, further comprising attaching the payload to the first or the second portion of the payload package body.

10. The method of claim 8, wherein the payload package body comprises a third beveled sidewall opposite the first beveled sidewall;

wherein the first portion comprises the second beveled sidewall and the second portion comprises a fourth beveled sidewall opposite the second beveled sidewall;

wherein the third beveled sidewall abuts the fourth beveled sidewall.

11. The method of claim 8, wherein the internal electrical connector comprises a printed circuit board;

wherein each of the at least one electrical contact comprises a via hole, in the printed circuit board, with an electrically conductive sidewall;

wherein the one end of each of the at least one electrical conductor is configured to be inserted into a unique via hole.

12. A payload in a package having an electrical interface to the payload, the payload in the package comprising:

a payload package electrical connector comprising an electrical connector body and at least one electrical conductor at least partially in the electrical connector body, wherein the electrical connector body has a first beveled sidewall;

a package body comprising a first portion comprising a first sidewall, a second portion comprising a second sidewall and attached to the first portion, a cavity between the first portion and the second portion, and an opening formed in part by the first sidewall and the second sidewall, wherein the first sidewall is configured to be opposite the second sidewall, wherein one of the first sidewall and the second sidewall comprises a second beveled sidewall, wherein the payload package electrical connector is in the opening, wherein the first beveled sidewall is configured to abut the second beveled sidewall, and wherein the first portion is attached to the second portion;

wherein the first portion further comprises a first recess;

wherein the second portion further comprises a second recess;

an internal electrical connector comprising at least one electrical contact and inserted into each of the first recess and the second recess;

wherein each electrical contact is configured to be electrically connected to the payload configured to be mounted in the cavity;

where one end of each of the at least one electrical conductor is electrically connected to a unique one of the at least one electrical contact; and the payload directly or indirectly mounted to the first or the second portion, and enclosed by the payload package electrical connector, the first portion, and the second portion.

13. The payload in the package of claim 12, wherein the payload is an inertial measurement unit.

14. The payload in the package of claim 12, wherein the payload is a microelectromechanical systems inertial measurement unit.

15. The payload in the package of claim 12, wherein the internal electrical connector comprises a printed circuit board;

wherein each of the at least one electrical contact comprises a via hole, in the printed circuit board, with an electrically conductive sidewall;

wherein the one end of each of the at least one electrical conductor is configured to be inserted into a unique via hole.

16. The payload in the package of claim 12, wherein the package body comprises a third beveled sidewall opposite the first beveled sidewall;

wherein the first portion comprises the second beveled sidewall and the second portion comprises a fourth beveled sidewall opposite the second beveled sidewall;

wherein the third beveled sidewall is configured to abut the fourth beveled sidewall.

17. The payload in the package of claim 12, wherein the first or the second portion further comprises at least one pedestal on which the payload is configured to be directly or indirectly mounted.

18. The payload in the package of claim 12, wherein the electrical connector body comprises an electrical insulator.

19. The payload in the package of claim 12, wherein the first portion and the second portion each comprise an electrical insulator.

20. The payload in the package of claim 12, wherein the first portion and the second portion are attached by at least one screw.

* * * * *